G. C. THOMPSON.
BRAKE FOR RAILWAY CARS.
APPLICATION FILED JUNE 11, 1909.

963,961.

Patented July 12, 1910.

Witnesses:

Inventor:
George C. Thompson,
By *Horace Pettit*
Attorney.

UNITED STATES PATENT OFFICE.

GEORGE C. THOMPSON, OF PHILADELPHIA, PENNSYLVANIA, ASSIGNOR OF ONE-HALF TO FREDERICK C. ECKERT AND ONE-HALF TO HENRY HEILEMANN, BOTH OF PHILADELPHIA, PENNSYLVANIA.

BRAKE FOR RAILWAY-CARS.

963,961.  Specification of Letters Patent.  Patented July 12, 1910.

Application filed June 11, 1909. Serial No. 501,761.

*To all whom it may concern:*

Be it known that I, GEORGE C. THOMPSON, a citizen of the United States, and a resident of Philadelphia, Pennsylvania, have invented certain new and useful Improvements in Brakes for Railway-Cars, of which the following is a specification.

This invention relates to improvements in brakes, and particularly to that class of brakes used upon trolley cars or other railway cars of any description; and the main objects of this invention are to provide a cheap and simple brake that may be readily applied to any railway car; to provide a brake that may be easily operated, and that will be effective to stop a car under any conditions; and to provide other improvements as will appear hereinafter.

Figure 1:
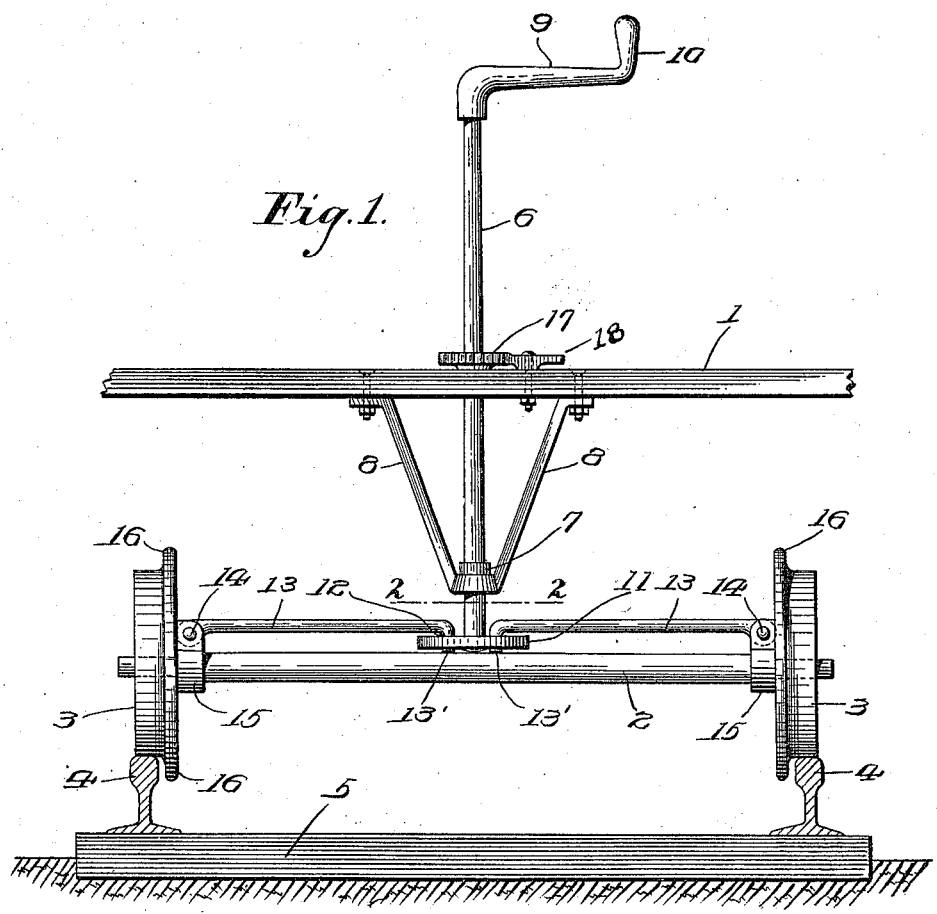
Figure 2:
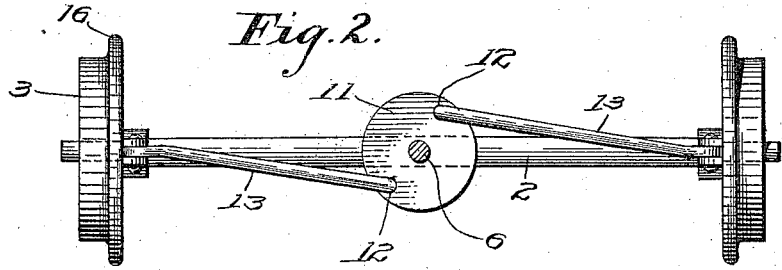

In the accompanying drawings, Figure 1 is a front elevation of a brake constructed in accordance with this invention and applied to a car; Fig. 2 is a top plan view of the same partially in horizontal section on line 2—2 of Fig. 1.

Referring to the drawings, one embodiment of this invention is shown applied to a car of the usual design, having a floor or frame 1 supported in any well known manner upon an axle 2 having rotatably mounted at each end thereof, a flanged wheel 3 raised upon the usual rail 4, carried upon the usual road bed 5.

The form of the device illustrated comprises a vertical crank shaft 6, rotatably mounted in the floor or frame of the car and rotatably supported adjacent its lower end in a bearing 7, supported beneath the frame 1 by the braces 8. The crank shaft 6 is provided at its upper end with a substantially horizontal crank arm 9, the outer end of which is turned upwardly to form a handle 10 for actuating the brake. The lower end of the crank shaft projects downwardly through the bearing 7 and is provided at its lower end with a circular wrist plate 11 rigid therewith.

The wrist plate 11 is provided with diametrically opposite apertures 12 adjacent the periphery thereof, in each of which rotatably engages the downturned end 13' of a substantially horizontal outwardly extending connecting rod 13, the downturned end projecting through the wrist plate and being upset or headed to hold it in position. The outer end of each connecting rod is connected by means of a pin or rivet 14 between the ends of a yoke or sleeve 15 surrounding the axle 2 upon the inside of and in contact with one of the wheels 3, the sleeve 15 being movable longitudinally of the axle.

The wheels 3 are mounted upon the axle so as to have a slight amount of end play or movement longitudinally of the axle, so that when the actuating handle 10 is given a partial turn clockwise, or in a suitable direction according to the construction of the brake, the wrist plate 11 will be rotated in the same direction to force the sleeve 15 outwardly against the inner surfaces of the wheels 3, forcing the wheels outwardly and causing the sides of the rims 16 to grip or bind against the inner surfaces of the rails, thus impeding the progress of the car and when sufficient pressure is applied to the handle 10, the car will be brought to a full stop. A ratchet wheel 17 is rigidly secured around the crank shaft 6 adjacent the upper surface of the floor 1 of the car and is adapted to be engaged by a dog or pawl 18 pivoted to the floor to hold the brake locked.

This brake is very effective and will operate to stop a car even when the tracks are wet and slippery or covered with snow or ice, thus obviating the need of using sand upon the tracks, and avoiding the expense and delay incident thereto. Furthermore, as this brake acts upon the sides of the rims of the wheels and tends to bind the wheels between the tracks, the wheels cannot be worn excessively in any place upon their cylindrical surfaces, and thus the wheels of a car equipped with this brake cannot become "flat" as is the frequent result when the ordinary style of brake is used. This brake may also be used in starting a car upon a slippery track as by partially applying the brakes, the wheels are caused to grip the track sufficiently to start the car.

With this construction in mind, it is evident that the brake is simple and cheap to construct, and may be applied to any car; and that it saves time and expense in the operation of a car and reduces the liability to accidents as the car may always be kept under control.

Although one form of this invention only has been illustrated, it is obvious that many changes might be made in the construction shown without departing from the spirit of the invention or the scope of the appended claims.

Having thus fully described my invention, I claim and desire to protect by Letters Patent of the United States:

1. The combination with a railway car provided with separable wheels, of means arranged to move one of said wheels laterally to cause a side portion of said wheel to engage against the side of a rail to act as a brake on said car.

2. The combination with a railway car provided with separable flanged wheels, of means to move one of said wheels laterally to cause the flange on said wheel to engage against a supporting rail to brake said car.

3. The combination with a railway car, of a wheel carried by said car and arranged to engage a rail, of means to move said wheel longitudinally of its axis to act as a brake upon said car.

4. The combination with a railway car provided with a pair of wheels movable toward and away from each other, of means to move said wheels longitudinally of their axes, to act as a brake upon said car.

5. The combination with a railway car, of an axle, a wheel carried thereby, and movable longitudinally with respect thereto, and means to move said wheel longitudinally of said axle to act as a brake for said car.

6. The combination with a railway car, of a flanged wheel carried thereby, and means to move said flanged wheel longitudinally of its axis to act as a brake for said car.

7. The combination with a car, of an axis carried thereby, a wheel rotatably mounted upon said axle and movable longitudinally thereof, and rotatable means carried by said car to move said wheel longitudinally of said axle to act as a brake.

8. The combination with a car, of an axle carried thereby, a wheel rotatably mounted upon said axle and movable longitudinally thereof, a sleeve surrounding said axle and movable longitudinally thereon, a connecting rod secured to said sleeve and a crank shaft connected to said connecting rod.

9. In a railway car, the combination with an axle, of a wheel rotatably mounted upon each end thereof and movable longitudinally thereof, a sleeve mounted upon said axle inside of each of said wheels, and movable longitudinally of said axle, a crank shaft rotatably carried by said car, a crank arm for rotating said crank shaft, a wrist plate carried by said crank shaft, and a connecting rod between said wrist plate and each of said sleeves to move said sleeves longitudinally upon said axle to spread said wheels.

10. The combination with a rail, of a railway car having a wheel mounted upon said rail, the periphery of said wheel projecting below the top surface of said rail, and brake actuating means for moving said wheel laterally with respect to said car to force a side portion of said wheel against a side portion of said rail to brake said car.

11. The combination with a rail, of a car movable longitudinally of said rail, means carried by said car and engaging said rail and movable laterally with respect to said rail, and means to force said first mentioned means laterally with respect to said rail and against said rail to brake said car.

12. The combination with a pair of parallel rails, of a car movable longitudinally of said rails, means engaging each of said rails and carried by said car, whereby said car is guided, each of said means being movable laterally with respect to said rails, and means to force each of said guiding means laterally against its rail to brake said car.

13. The combination with a pair of parallel rails, of a car movable longitudinally of said rails, means engaging each of said rails and carried by said car, whereby said car is supported and guided, each of said means being movable laterally with respect to said rails, and means to force each of said supporting and guiding means laterally against its rail to brake said car.

14. The combination with a rail, of a car movable longitudinally of said rail, means carried by said car and engaging said rail and movable transversely with respect to said rail, and means to force said first mentioned means transversely with respect to said rail and against said rail to brake said car.

In witness whereof I have hereunto set my hand this 26th day of May, A. D., 1909.

GEORGE C. THOMPSON.

Witnesses:
ADDISON IRWIN GARDNER,
ALEXANDER PARK.